United States Patent
Merry

(10) Patent No.: US 7,550,118 B2
(45) Date of Patent: Jun. 23, 2009

(54) MULTILAYER MATS FOR USE IN POLLUTION CONTROL DEVICES

(75) Inventor: Richard P. Merry, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 666 days.

(21) Appl. No.: 10/823,852

(22) Filed: Apr. 14, 2004

(65) Prior Publication Data
US 2005/0232827 A1     Oct. 20, 2005

(51) Int. Cl.
- B01D 50/00    (2006.01)
- F01N 3/10     (2006.01)
- F02M 33/02    (2006.01)
- C04B 14/00    (2006.01)
- B32B 3/14     (2006.01)
- B05D 3/02     (2006.01)

(52) U.S. Cl. ............... 422/179; 422/171; 422/177; 422/180; 422/174; 123/519; 252/378 R; 427/376.1; 427/402; 427/419.1; 428/57; 428/77

(58) Field of Classification Search ............... 422/179, 422/221, 171, 177, 180, 174, 268, 186.21, 422/245.1; 442/414; 29/890, 515; 264/156, 264/162, 279, 1.24, 2.2, 45.1, 45.3, 45.4, 264/45.9, 650, 570; 427/402, 419.1, 376.1; 428/352, 355 AC, 292.1, 34.4, 57, 77; 252/378 R; 106/626; 423/423, 326; 55/520, 521, 502, 55/498; 277/606, 607; 123/519; 60/297, 60/313; 501/95.1

See application file for complete search history.

(56) References Cited

U.S. PATENT DOCUMENTS

| | | | |
|---|---|---|---|
| 3,001,571 A | 9/1961 | Hatch | |
| 3,458,329 A | 7/1969 | Owens et al. | |
| 3,760,049 A | 9/1973 | Borer et al. | |
| 3,916,057 A | 10/1975 | Hatch et al. | |
| 4,011,651 A | 3/1977 | Bradbury et al. | |
| 4,048,363 A | 9/1977 | Langer et al. | |
| 4,156,533 A | 5/1979 | Close et al. | |
| 4,181,514 A | 1/1980 | Lefkowitz et al. | |
| 4,220,559 A | 9/1980 | Polinski | |
| 4,305,992 A | 12/1981 | Langer et al. | |
| 4,362,016 A * | 12/1982 | Papadopulos | 60/297 |
| 4,385,135 A | 5/1983 | Langer et al. | |
| 4,521,333 A | 6/1985 | Graham et al. | |

(Continued)

FOREIGN PATENT DOCUMENTS

EP     0 319 299 A2    6/1989

(Continued)

OTHER PUBLICATIONS

Gulati et al., "New Developments in Packaging of Ceramic Honeycomb Catalysts", SAE Technical Paper 922252, pp. 91-99 (1992).

(Continued)

*Primary Examiner*—Walter D Griffin
*Assistant Examiner*—Huy-Tram Nguyen

(57) ABSTRACT

Multilayer mats, pollution control devices containing the multilayer mats, and methods of making the multilayer mats are provided. The multilayer mats include a non-intumescent layer sandwiched between two intumescent layers. The outer layers of the mats contain intumescent materials.

21 Claims, 3 Drawing Sheets

U.S. PATENT DOCUMENTS

| | | | |
|---|---|---|---|
| 4,863,700 A | | 9/1989 | Ten Eyck |
| 4,929,429 A | * | 5/1990 | Merry ................. 422/179 |
| 4,999,168 A | * | 3/1991 | Ten Eyck ............. 422/179 |
| 5,008,086 A | | 4/1991 | Merry |
| 5,028,397 A | | 7/1991 | Merry |
| 5,032,441 A | | 7/1991 | Ten Eyck et al. |
| 5,078,822 A | | 1/1992 | Hodges et al. |
| 5,207,989 A | | 5/1993 | MacNeil |
| 5,242,871 A | | 9/1993 | Hashimoto et al. |
| 5,250,269 A | | 10/1993 | Langer |
| 5,254,410 A | | 10/1993 | Langer et al. |
| 5,332,699 A | | 7/1994 | Olds et al. |
| 5,376,341 A | * | 12/1994 | Gulati ................. 422/179 |
| 5,385,873 A | | 1/1995 | MacNeill |
| 5,482,686 A | * | 1/1996 | Lebold et al. ........ 422/179 |
| 5,580,532 A | | 12/1996 | Robinson et al. |
| 5,585,312 A | | 12/1996 | Ten Eyck et al. |
| 5,666,726 A | * | 9/1997 | Robinson et al. ......... 29/890 |
| 5,714,421 A | | 2/1998 | Olds et al. |
| 5,724,735 A | | 3/1998 | Ickes et al. |
| 5,811,063 A | | 9/1998 | Robinson et al. |
| 5,853,675 A | * | 12/1998 | Howorth .............. 422/179 |
| 5,866,079 A | | 2/1999 | Machida et al. |
| 5,874,375 A | | 2/1999 | Zoitos et al. |
| 6,051,193 A | * | 4/2000 | Langer et al. ........ 422/179 |
| 6,224,835 B1 | | 5/2001 | Langer |
| 6,365,267 B1 | | 4/2002 | Langer et al. |
| 6,458,418 B2 | * | 10/2002 | Langer et al. ......... 427/376.1 |
| 6,596,120 B2 | | 7/2003 | Davis et al. |
| 6,613,294 B2 | * | 9/2003 | Sanocki et al. ........ 422/179 |
| 6,613,295 B1 | * | 9/2003 | Kageyama et al. ...... 422/179 |
| 6,670,020 B1 | * | 12/2003 | Maus ................. 428/116 |
| 6,960,386 B2 | * | 11/2005 | Agata ................. 428/323 |
| 2001/0046456 A1 | * | 11/2001 | Langer et al. ......... 422/179 |
| 2002/0025904 A1 | | 2/2002 | Goto et al. |
| 2002/0139660 A1 | * | 10/2002 | Keppel ................ 204/164 |
| 2003/0124930 A1 | * | 7/2003 | Horrocks et al. ....... 442/131 |
| 2006/0070554 A1 | * | 4/2006 | Braunreiter et al. .... 106/711 |
| 2006/0154040 A1 | * | 7/2006 | Merry ................. 428/292.1 |
| 2007/0140929 A1 | * | 6/2007 | Watanabe et al. ....... 422/179 |

FOREIGN PATENT DOCUMENTS

| | | |
|---|---|---|
| EP | 0 396 331 A1 | 11/1990 |
| EP | 0 492 977 A1 | 7/1992 |
| EP | 0 579 956 A1 | 1/1994 |
| EP | 0 602 018 A1 | 6/1994 |
| EP | 0 639 700 B1 | 2/1995 |
| EP | 0 639 701 A1 | 2/1995 |
| EP | 0 639 702 A1 | 2/1995 |
| EP | 1 314 866 A2 | 5/2003 |
| GB | 1 425 934 | 2/1976 |
| GB | 1 445 331 | 8/1976 |
| JP | 56-85012 | 7/1981 |
| JP | 58-13683 | 1/1983 |
| JP | 7-91124 | 10/1995 |
| JP | 10-288032 | 10/1998 |
| WO | WO 94/24425 | 10/1994 |
| WO | WO 98/04404 | 2/1998 |
| WO | WO 99/46028 | 9/1999 |
| WO | WO 03/031368 | 4/2003 |
| WO | WO 2004/011785 | 2/2004 |

OTHER PUBLICATIONS

Richard Merry, EP application No. #03101686.8, filed Jun. 10, 2003.
Bode et al., *Material Aspects in Automotive Pollution Control Devices*, Wiley-VCH, pp. 206-208 (2002).
Howitt et al., "*Cellular Ceramic Diesel Particulate Filter*", SAE Technical Paper 810114 (1981).

* cited by examiner

MULTILAYER MATS FOR USE IN POLLUTION CONTROL DEVICES

FIELD OF INVENTION

A multilayer mat is disclosed that is suitable for use in mounting a pollution control element within a pollution control device.

BACKGROUND

Pollution control devices are used on motor vehicles to reduce atmospheric pollution. Two types of devices are currently in widespread use: catalytic converters and diesel particulate filters or traps. Catalytic converters contain one or more catalysts, which are typically coated on the surface of a monolithic structure. The monolithic structure is typically ceramic, although metal monoliths have been used. The catalyst(s) oxidize carbon monoxide and hydrocarbons or reduce the oxides of nitrogen in exhaust gases. Diesel particulate filters or traps typically are in the form of wall flow filters that have a honeycombed monolithic structure made from porous crystalline ceramic materials. In the current state-of-the-art construction of these pollution control devices, the monolithic structure of each type is enclosed within a metal housing.

Protective packing materials are typically positioned between the monolith and the metal housing to protect the monolith from road shock and vibration, to compensate for the thermal expansion difference between the metal housing and the monolith, and to prevent exhaust gases from passing between the monolith and the metal housing. The process of positioning the protective packing material is referred to as "canning" and includes such processes as injecting a paste into a gap between the monolith and the metal housing, or wrapping a sheet material (i.e., mounting mat) around the monolith and inserting the wrapped monolith into the housing, pressing the housing closed, and welding flanges along the lateral edges of the housing.

Typically, the compositions used to form conventional protective packing materials include glass or refractory ceramic fibers that provide properties such as high temperature durability, good handling, resiliency, flexibility, and strength. An intumescent material can also be included that enables the protective packing materials to volumetrically expand at elevated temperatures. Such expansion can help hold the monolith in place during use.

SUMMARY

Multilayer mats, pollution control devices containing the multilayer mats, and methods of making the multilayer mats are provided. More specifically, the multilayer mats include a non-intumescent layer sandwiched between two intumescent layers.

In one aspect, a multilayer mat is provided that includes at least three layers: a non-intumescent layer having a first major surface and a second major surface opposite the first major surface, wherein the non-intumescent layer includes inorganic fibers; a first intumescent layer facing the first major surface of the non-intumescent layer, wherein the first intumescent layer is a first outer layer of the multilayer mat; and a second intumescent layer facing the second major surface of the non-intumescent layer, wherein the second intumescent layer is a second outer layer of the multilayer mat.

In another aspect, a pollution control device is provided that has a first metal housing, a pollution control element inside the first metal housing, and a multilayer mat positioned between the first metal housing and the pollution control element. The multilayer mat includes at least three layers: a non-intumescent layer having a first major surface and a second major surface opposite the first major surface, wherein the non-intumescent layer includes inorganic fibers; a first intumescent layer facing the first major surface of the non-intumescent layer, wherein the first intumescent layer is a first outer layer of the multilayer mat; and a second intumescent layer facing the second major surface of the non-intumescent layer, wherein the second intumescent layer is a second outer layer of the multilayer mat. In some embodiments, the pollution control device is placed within a second metal housing, such as a muffler, and an exhaust gas passes between the first metal housing and the second metal housing.

In yet another aspect, a method of forming a multilayer mat is provided. An intumescent layer is provided that has a first major surface and a second major surface opposite the first major surface. A first intumescent layer is positioned to face the first major surface of the intumescent layer, wherein the first intumescent layer is a first outer layer of the multilayer mat. A second intumescent layer is positioned to face the second major surface of the intumescent layer, wherein the second intumescent layer is a second outer layer of the multilayer mat.

As used herein, the terms "a", "an", and "the" are used interchangeably with "at least one" to mean one or more of the elements being described.

BRIEF DESCRIPTION OF THE DRAWINGS

The invention can be more completely understood in consideration of the following detailed description of various embodiments of the invention in connection with the accompanying drawings, in which.

Figure 1:
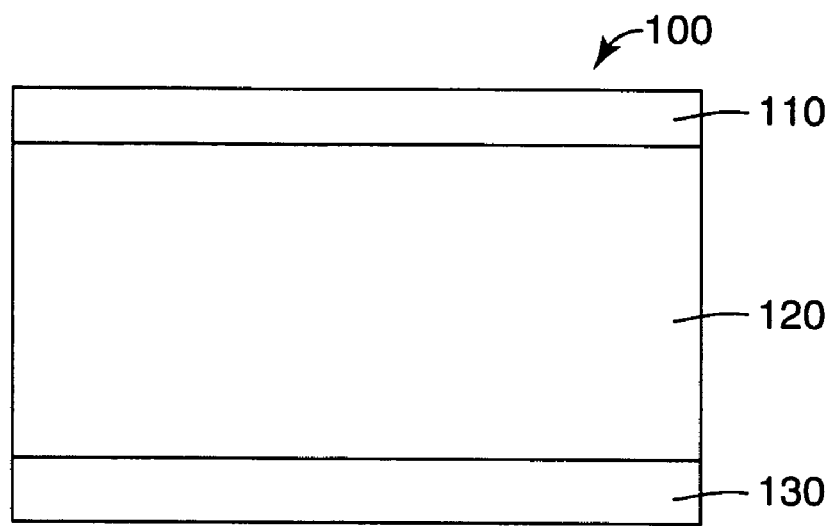
FIG. 1 is a schematic cross-sectional view of one embodiment of a multilayer mat.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In one aspect of the present invention, a multilayer mat is provided that includes at least three layers: a non-intumescent layer having a first major surface and a second major surface opposite the first major surface, wherein the non-intumescent layer contains inorganic fibers; a first intumescent layer facing the first major surface of the non-intumescent layer, wherein the first intumescent layer is a first outer layer of the multilayer mat; and a second intumescent layer facing the second major surface of the non-intumescent layer, wherein the second intumescent layer is a second outer layer of the multilayer mat. That is, the non-intumescent layer is sandwiched between two intumescent layers and each outer layer of the multilayer mat contains intumescent materials.

One embodiment of a multilayer mat 100 is shown in FIG. 1. The multilayer mat 100 includes three layers arranged in the following order: a first intumescent layer 110, a non-intumescent layer 120 that contains inorganic fibers, and a second intumescent layer 130. Although FIG. 1 shows a multilayer mat having only three layers, additional layers may be present provided that the outer layers of the multilayer mat are intumescent. The multilayer mats can have, for example, two or more adjacent intumescent layer, two or more adjacent non-intumescent layers, and alternating non-intumescent and intumescent layers.

Some specific examples include, but are not limited to, layers arranged in the following order: intumescent/non-intumescent/intumescent/non-intumescent/intumescent; intumescent/intumescent/non-intumescent/intumescent; and intumescent/non-intumescent/non-intumescent/intumescent; and the like. Each of these examples has a non-intumescent layer sandwiched between two intumescent layers. Additionally, each of these examples has outer layers that are intumescent.

As used herein, "intumescent" refers to a material that exhibits at least 10 percent free expansion in thickness when heated to a temperature of about 800° C. to about 900° C. Some intumescent materials have at least 12 percent, at least 15 percent, or at least 20 percent free expansion in thickness when heated to these temperatures. The intumescent material can usually expand, at least to some extent, at a temperature of at least about 400° C. or at least about 500° C. Free expansion refers to the amount of expansion in the Z-axis that the material undergoes when heated without constraints.

As used herein, "non-intumescent" refers to a material that exhibits less than 10 percent free expansion in thickness under the same conditions. Some non-intumescent materials expand less than 8 percent, less than 6 percent, less than 4 percent, less than 2 percent, or less than 1 percent when heated.

The multilayer mats include a non-intumescent layer sandwiched between two intumescent layers. The non-intumescent layer contains inorganic fibers. Any inorganic fiber that is known to be suitable for use in a mounting mat for a pollution control device can be selected. For example, the inorganic fibers can be alumina fibers, mullite fibers, quartz fibers, silicon carbide fibers, silicon nitride fibers, metal fibers, aluminosilicate fibers, magnesium aluminosilicate fibers, aluminoborosilicate fibers, zirconia fibers, titania fibers, and the like. The fibers can be amorphous, crystalline, or a combination thereof.

Quartz fibers are commercially available under the trade designation "ASTROQUARTZ" from J. P. Stevens, Inc. (Slater, N.C.). Silicon carbide fibers are commercially available from Nippon Carbon (Tokyo, Japan) under the trade designation "NICALON" or from Textron Specialty Materials (Lowell, Mass.) under the trade designation "TYRANNO". Silicon nitride fibers are commercially available from Toren Energy International Corp. (New York, N.Y.). Metal fibers are commercially available from Beckaert (Zweregan, Belgium) under the trade designation "BEKI-SHELD GR 90/C2/4" and from Ribbon Technology Corp. (Gahana, Ohio) under the trade designation "RIBTEC".

In some embodiments of the non-intumescent layer, the inorganic fibers are glass fibers. As used herein, the term "glass fibers" refers to inorganic fibers that are prepared from an inorganic fusion material that has been cooled without substantial crystallization. The glass fibers are amorphous as determined using either x-ray diffraction or transmission electron microscopic techniques. The glass fibers, at least in some applications, are shot free (i.e., the fibers contain no greater than 5 weight percent shot, no greater than 3 weight percent shot, no greater than 2 weight percent shot, no greater than 1 weight percent shot, or no greater than 0.5 weight percent shot). As used herein, the term "shot" refers to non-fibrous particles that can be a by-product of some inorganic fiber formation processes.

Suitable glass fibers are often magnesium aluminosilicate fibers. Such glass fibers can contain at least 50 weight percent $SiO_2$, at least 8 weight percent $Al_2O_3$, and at least 1 weight percent magnesium oxide. For example, magnesium aluminosilicate fibers can contain 50 to 70 weight percent, 50 to 60 weight percent, 60 to 70 weight percent, or 55 to 65 weight percent $SiO_2$; 8 to 30 weight percent, 10 to 20 weight percent, or 20 to 30 weight percent $Al_2O_3$; and 1 to 15 weight percent, 1 to 12 weight percent, 1 to 10 weight percent, or 1 to 8 weight percent magnesium oxide. Additional oxides can be present such as sodium oxide, potassium oxide, boron oxide, calcium oxide, and the like.

Specific examples of magnesium aluminosilicate glass fibers are E-glass fibers, S-glass fibers, S2-glass fibers, and R-glass fibers. E-glass fibers often contain about 55 weight percent $SiO_2$, about 11 weight percent $Al_2O_3$, about 6 weight percent $B_2O_3$, about 18 weight percent CaO, about 5 weight percent MgO, and about 5 weight percent other oxides. S-glass and S2-glass fibers typically contain about 65 weight percent $SiO_2$, about 25 weight percent $Al_2O_3$, and about 10 weight percent MgO. R-glass fibers usually contain about 60 weight percent $SiO_2$, about 25 weight percent $Al_2O_3$, about 9 weight percent CaO, and about 6 weight percent MgO. E-glass fibers, S-glass fibers, and S2-glass fibers are commercially available from Advanced Glassfiber Yarns, LLC (Aiken, S.C.) and Owens-Corning Fiberglass Corp. (Granville, Ohio). R-glass fibers are commercially available from Saint-Gobain Vetrotex (Herzogenrath, Germany).

Various refractory ceramic fibers can be used in the non-intumescent layer. In some embodiments, the ceramic fibers are amorphous and contain mainly $Al_2O_3$ and $SiO_2$. Small amounts of other oxides can be present. The weight ratio of $Al_2O_3$ to $SiO_2$ ($Al_2O_3$: $SiO_2$) is usually greater than or equal to 20:80, 30:70, 35:65, 40:60. 45:55, 50:50, 55:45, 60:40, or 70:30. The ceramic fibers typically include at least 30 weight percent $SiO_2$ and at least 20 weight percent $Al_2O_3$. For example, suitable ceramic fibers can contain $SiO_2$ in an amount of 30 to 80 weight percent and $Al_2O_3$ in an amount of 20 to 70 weight percent weight percent based on the weight of the fibers. In some specific examples, the ceramic fibers can contain $SiO_2$ in an amount of 40 to 60 weight percent and alumna in an amount of 40 to 60 weight percent based on the weight of the fibers. In other specific examples, the ceramic fibers can contain $SiO_2$ in an amount of 45 to 55 weight percent and $Al_2O_3$ in an amount of 45 to 55 weight percent based on the weight of the fibers.

Exemplary amorphous ceramic fibers include, but are not limited to, those commercially available from Thermal Ceramics (Augusta, Ga.) under the trade designation "KAOWOOL HA BULK" with 50 weight percent $SiO_2$ and 50 weight percent $Al_2O_3$ based on the weight of the fibers; from Thermal Ceramics under the trade designation "CERAFIBER" with 54 weight percent $SiO_2$ and 46 weight percent $Al_2O_3$ based on the weight of the fiber; from Thermal Ceramics under the trade designation "KAOWOOL D73F" with 54 weight percent $SiO_2$ and 46 weight percent $Al_2O_3$ based on the weight of the fiber; from Rath (Wilmington, Del.) under the trade designation "RATH 2300 RT" with 52 weight percent $SiO_2$, 47 weight percent $Al_2O_3$, and no greater than 1 weight percent $Fe_2O_3$, $TiO_2$, and other oxides based on the weight of the fibers; from Rath under the trade designation "RATH ALUMINO-SILICATE CHOPPED FIBER" with 54 weight percent $SiO_2$, 46 weight percent $Al_2O_3$, and no greater than 1 weight percent of other oxides based on the weight of the fiber; from Vesuvius (Buffalo, N.Y.) under the trade designation "CER-WOOL RT" with 49 to 53 weight percent $SiO_2$, 43 to 47 weight percent $Al_2O_3$, 0.7 to 1.2 weight percent $Fe_2O_3$, 1.5 to 1.9 weight percent $TiO_2$, and no greater than 1 weight percent other oxides based on the weight of the fibers; from Vesuvius under the trade designation "CER-WOOL LT" with 49 to 57 weight percent $SiO_2$, 38 to 47 weight percent $Al_2O_3$, 0.7 to 1.5 weight percent $Fe_2O_3$, 1.6 to 1.9 weight percent $TiO_2$, and 0 to 0.5 weight percent other oxides based on the weight of the fibers; and from Vesuvius under the trade designation "CER-WOOL HP" with 50 to 54 weight percent $SiO_2$, 44 to 49 weight percent $Al_2O_3$, 0 to 0.2 weight percent $Fe_2O_3$, 0 to 0.1 weight percent $TiO_2$, and no greater than 0.5 weight percent other oxides based on the weight of the fibers.

In other embodiments, the ceramic fibers are amorphous and contain mainly $SiO_2$, $Al_2O_3$, and $ZrO_2$. Small amounts of other oxides can be present. The weight ratio of $Al_2O_3$ to $SiO_2$ ($Al_2O_3$:$SiO_2$) is greater than or equal to 20:80, 30:70, 35:65, 40:60. 45:55, 50:50, 55:45, 60:40, or 70:30. The fibers contain at least 3 weight percent $ZrO_2$, at least 30 weight percent $SiO_2$, and at least 20 weight percent $Al_2O_3$ based on the weight of the fiber. In some embodiments, the fibers contain $ZrO_2$ in an amount up to 5 weight percent, up to 7 weight percent, up to 10 weight percent, up to 12 weight percent, up to 15 weight percent, up to 16 weight percent, up to 20, or up to 25 weight percent based on the weight of the fibers. The ceramic fibers can contain $SiO_2$ in an amount of 30 to 70, 40 to 65, 45 to 60, 45 to 55, or 50 to 60 weight percent based on the weight of the fibers. The ceramic fibers can contain $Al_2O_3$ in an amount of 20 to 60, 25 to 50, 25 to 45, 25 to 40, 25 to 35, 30 to 50, or 30 to 40 weight percent based on the weight of the fibers. In some specific examples, the ceramic fibers contain 25 to 50 weight percent $Al_2O_3$, 40 to 60 weight percent $SiO_2$, and 3 to 20 weight percent $ZrO_2$ based on the weight of the fibers. In other specific examples, the ceramic fibers contain 30 to 40 weight percent $Al_2O_3$, 45 to 60 weight percent $SiO_2$, and 5 to 20 weight percent $ZrO_2$ based on the weight of the fibers.

Exemplary amorphous ceramic fibers that contain $SiO_2$, $Al_2O_3$, and $ZrO_2$ are commercially available from Thermal Ceramics (Augusta, Ga.) under the trade designation "KAO-WOOL ZR" and "CERACHEM" with 50 weight percent $SiO_2$, 35 weight percent $Al_2O_3$, and 15 weight percent $ZrO_2$ based on the weight of the fiber; from Unifrax (Tonawonda, N.Y.) under the trade designation "UNIFRAX FIBERFRAX FIBERMAT" with 52 to 57 weight percent $SiO_2$, 29 to 47 weight percent $Al_2O_3$, and no greater than 18 weight percent $ZrO_2$ based on the weight of the fibers; from Unifrax under the trade designation "UNIFRAX FIBERFRAX DURABACK" with 50 to 54 weight percent $SiO_2$, 31 to 35 weight percent $Al_2O_3$, 5 weight percent $ZrO_2$, 1.3 weight percent $Fe_2O_3$, 1.7 weight percent $TiO_2$, 0.5 weight percent MgO, and no greater than 7 weight percent CaO based on the weight of the fibers; from Rath (Wilmington, Del.) under the trade designation "RATH 2600 HTZ" with 48 weight percent $SiO_2$, 37 weight percent $Al_2O_3$, 15 weight percent $ZrO_2$, and no greater than 1 weight percent other oxides based on the weight of the fibers; and from Vesuvius (Buffalo, N.Y.) under the trade designation "CER-WOOL HTZ" with 44 to 51 weight percent $SiO_2$, 33 to 37 weight percent $Al_2O_3$, 13 to 19 weight percent $ZrO_2$, 0.1 to 0.6 weight percent $Fe_2O_3$, 0.1 to 0.6 weight percent $TiO_2$, and no greater than 1 weight percent other oxides based on the weight of the fibers.

In some embodiments of the non-intumescent layer, the ceramic fibers have a bulk shrinkage no greater than 10 percent, no greater than 8 percent, no greater than 6 percent, no greater than 4 percent, no greater than 3 percent, no greater than 2 percent, or no greater than 1 percent using the Thermal Mechanical Analyzer (TMA) test. The ceramic fibers typically shrink at least 0.5 percent. In some embodiments, the ceramic fibers have a bulk shrinkage of 0.5 to 2 percent, 0.5 to 3 percent, 0.5 to 5 percent, or 0.5 to 6 percent.

In the TMA test, a sample under a load (e.g., 50 psi or 345 $N/m^2$) is heated to 1000° C. and then cooled. The caliper of the sample can be measured during both the heating and cooling cycles at 750° C. to calculate percent shrinkage. The percent shrinkage is equal to the difference in the caliper at 750° C. during the heating and cooling step multiplied by 100 and divided by the caliper at 750° C. during the heating step. The TMA test can be used to characterize the ceramic fibers or a non-intumescent layer prepared from ceramic fibers. Most or all of the organic materials that may be present in a non-intumescent layer are removed by time the temperature of the Thermal Mechanical Analyzer reaches 750° C.

Examples of ceramic fibers having a bulk shrinkage no greater than 10 percent as supplied (i.e., the fibers can be used as supplied without a heat-treatment) include, but are not limited to, fibers that are crystalline and that contain both $Al_2O_3$ and $SiO_2$. The weight ratio of $Al_2O_3$ to $SiO_2$ ($Al_2O_3$:$SiO_2$) can be greater than or equal to 60:40, 65:35, 70:30, 72:28, 75:25, 80:20, 90:10, 95:5, 96:4, 97:3, or 98:2. In some specific examples, the ceramic fibers contain 60 to 98 weight percent $Al_2O_3$ and 2 to 40 weight percent $SiO_2$ based on the weight of the fibers. In other specific examples, the ceramic fibers contain 70 to 98 weight percent $Al_2O_3$ and 2 to 30 weight percent $SiO_2$ based on the weight of the fibers. Traces of other oxides can be present. As used herein, the term "trace" refers to an amount no greater than 2 weight percent, no greater than 1 weight percent, or no greater than 0.5 weight percent.

Suitable ceramic fibers that are crystalline and have a bulk shrinkage no greater than 10 percent include, but are not limited, to those commercially available from Mitsubishi Chemical (Tokyo, Japan) under the trade designation "MAFTEC" (e.g., MLS1, MLS2, and MLS3) with 28 weight percent $SiO_2$ and 72 weight percent $Al_2O_3$ based on the weight of the fibers; from Saffil Limited (Widness Cheshire, U.K.) under the trade designation "SAFFIL" (e.g., SF, LA Bulk, HA Bulk, HX Bulk) with 3 to 5 weight percent $SiO_2$ and 95 to about 97 weight percent $Al_2O_3$ based on the weight of the fibers; and from Unifrax (Tonawonda, N.Y.) under the trade designation "UNIFRAX FIBERFRAX FIBERMAX" with 27 weight percent $SiO_2$ and 72 weight percent $Al_2O_3$ based on the weight of the fibers.

Further examples of ceramic fibers that are crystalline and have a bulk shrinkage no greater than 10 percent as supplied are aluminoborosilicate fibers. These fibers typically contain $Al_2O_3$ in an amount of at least 50 weight percent, $SiO_2$ in an amount no greater than 50 weight percent, and $B_2O_3$ in an amount no greater than 25 weight percent based on the weight of the fibers. Some specific aluminoborosilicate fibers contain 50 to 75 weight percent $Al_2O_3$, 25 to 50 weight percent $SiO_2$, and 1 to 25 weight percent $B_2O_3$ based on the weight of the fibers. Such aluminoborosilicate fibers are commercially available under the trade designation "NEXTEL 312" and "NEXTEL 440" from 3M Company (St. Paul, Minn.).

At least some of these ceramic fibers that are crystalline and that have a bulk shrinkage no greater than 10 percent as supplied by the manufacturer are prepared using a sol-gel process. In a sol-gel process, the ceramic fibers are formed by spinning or extruding a solution, dispersion, or viscous concentrate. The sol-gel process, which is further described in U.S. Pat. No. 3,760,049 (Borer et al.), can include extrusion of the solution, dispersion, or concentrate through orifices to form green fibers that are then fired to form ceramic fibers. The solution, dispersion, or concentrate contains the oxides or the precursors to the oxides that are in the fibers.

In some embodiments, commercially available amorphous ceramic fibers can be heat-treated to provide ceramic fibers that have a bulk shrinkage no greater than 10 percent. The ceramic fibers that can be heat-treated to provide fibers having a bulk shrinkage no greater than 10 percent typically are melt-blown or melt-spun from a mixture of $Al_2O_3$ and $SiO_2$ or a mixture of $Al_2O_3$ and $SiO_2$ with other oxides such as $B_2O_3$, $P_2O_5$, or $ZrO_2$. Exemplary amorphous ceramic fibers that can be heat-treated include, but are not limited to, ceramic fibers commercially available from Thermal Ceramics (Augusta, Ga.) under the trade designation "KAOWOOL HA BULK", "CERAFIBER", "KAOWOOL D73F", "KAOWOOL ZR", or "CERACHEM"; from Rath (Wilmington, Del.) under the trade designation "RATH 2300 RT", "RATH ALUMINO-SILICIATE CHOPPED FIBER", or "RATH 2600 HTZ"; from Vesuvius (Buffalo, N.Y.) under the trade designation "CER-WOOL RT", "CER-WOOL LT", or "CER-WOOL HTZ", or "CER-WOOL HP"; and from Unifrax (Tonawonda, N.Y.) under the trade designation "UNIFRAX FIBERFRAX FIBERMAT" or "UNIFRAX FIBERFRAX DURABACK".

The ceramic fibers tend to devitrify (i.e., change, at least in part, from an amorphous state into a microcrystalline or crystalline state) during the heat-treatment process. Usually, only a portion of the individual ceramic fiber undergoes devitrification. That is, after heat-treatment, the individual ceramic fibers contain amorphous material as well as crystalline material, microcrystalline material, or a combination of crystalline and microcrystalline material.

Techniques such as transmission electron microscopy and x-ray diffraction can be used to characterize the amorphous, crystalline, or microcrystalline nature of inorganic fibers. As used herein, the term "amorphous" refers to inorganic fibers that are free of crystalline or microcrystalline regions. If the inorganic fibers are amorphous, no diffraction peaks (i.e., no diffraction pattern) can be detected using either transmission electron microscopy or x-ray diffraction. If the inorganic fiber contains regions having a small crystalline size (i.e., microcrystalline), diffraction peaks (i.e., a diffraction pattern) can be detected using transmission electron microscopy but not using x-ray diffraction. As used herein, the term "microcrystalline" refers to inorganic fibers that have at least some regions with a crystalline character and that have a crystal size detectable with transmission electron microscopy but not with x-ray diffraction. If the inorganic fibers contain regions having a larger crystalline size (i.e., crystalline), a diffraction pattern can be obtained using x-ray diffraction. As used herein, the term "crystalline" refers to inorganic fibers that have at least some regions with a crystalline character and that have a crystal size detectable with x-ray diffraction. The smallest crystal sizes detectable using x-ray diffraction typically results in a broad diffraction pattern without well-defined peaks. Narrower peaks indicate a larger crystalline size. The width of the diffraction peaks can be used to determine the crystalline size. The inorganic fibers that are crystalline are typically polycrystalline rather than being a single crystal.

In some applications, the ceramic fibers are heat-treated at a temperature of at least 700° C. For example, the ceramic fibers can be heat-treated at a temperature of at least 800° C., at a temperature of at least 900° C., at a temperature of at least 1000° C., or at a temperature of at least 1100° C. Suitable heat-treatment temperatures can vary depending on the composition of the ceramic fibers and the time the ceramic fibers are held at the heat-treatment temperature. Suitable heat-treatment methods and suitable heat-treated ceramic fibers are further described, for example, in International Patent Application WO 99/46028 (Fernando et al.) and U.S. Pat. No. 5,250,269 (Langer), the disclosure of which are incorporated herein by reference.

There is a time-temperature relationship associated with the size of crystals or microcrystals that form during the heat-treatment process. For example, the ceramic fibers can be heat-treated at lower temperatures for longer periods of time or at higher temperatures for shorter periods of time to produce a comparable state of crystallinity or microcrystallinity. The time at the heat-treatment temperature can be up to 1 hour, up to 40 minutes, up to 30 minutes, up to 20 minutes, up to 10 minutes, up to 5 minute, up to 3 minutes, or up to 2 minutes. For example, the heat-treatment temperature can be chosen to use a relatively short heat-treatment time such as up to 10 minutes.

The temperature of the heat-treatment can be chosen to be at least 20° C., at least 30° C., at least 40° C., at least 50° C., at lest 60° C., at least 70° C., at least 80° C., at least 90° C., or at least 100° C. above the devitrification temperature (i.e., the temperature at which the ceramic fibers change from being an amorphous material to being a microcrystalline or crystalline material). Suitable heat-treatment times and temperatures for the ceramic fibers can be determined using techniques such as, for example, Differential Thermal Analysis (DTA). The temperature for $Al_2O_3$—$SiO_2$ fibers is typically in the range of 700° C. to 1200° C., in the range of 800° C. to 1200° C., in the range of 900° C. to 1200° C., or in the range of 950° C. to 1200° C.

A ceramic fiber that is completely amorphous usually shrinks more than ceramic fiber that contain regions that are microcrystalline, crystalline, or a combination thereof. Ceramic fibers that are at least partially crystalline or microcrystalline can be fabricated into mounting mats that can be repeatedly heated to a temperature suitable for use in a pollution control device and then cooled. Microcrystalline or crystalline ceramic fibers tend to be resistant to further shrinkage that could negatively impact the performance of the non-intumescent layer.

For ceramic fibers that are subjected to heat-treatment, the brittleness of the fibers can be balanced with the low bulk shrinkage characteristics. Crystalline or microcrystalline materials ceramic fibers tend to be more brittle than amorphous ceramic fibers. Non-intumescent layers made from crystalline or microcrystalline ceramic fibers can break more easily than insulation prepared from amorphous fibers. On the other hand, crystalline or microcrystalline ceramic fibers tend to have a lower bulk shrinkage than amorphous ceramic fibers.

The average diameter of the inorganic fibers is typically at least 3 micrometers, at least 4 micrometers, at least 5 micrometers, at least 6 micrometers, or at least 7 micrometers. The inorganic fibers usually have an average diameter that is no greater than 20 micrometers, no greater than 18 micrometers, no greater than 16 micrometers, or no greater than 14 micrometers. In some embodiments, at least 60 weight percent of the inorganic fibers have an average diameter that is within 3 micrometers of the average diameter. For example, at least 70 weight percent, at least 80 weight percent, or at least 90 weight percent of the inorganic fibers have an average diameter that is within 3 micrometers of the average diameter.

The non-intumescent layer can further contain an organic binder in amounts up to 20 weight percent based on the weight of the non-intumescent layer. In some embodiments, the organic binder is present in amounts up to 10 weight percent, up to 5 weight percent, or up to 3 weight percent based on the weight of the non-intumescent layer. The organic binder is typically burned off when the multilayer mat containing the non-intumescent layer is used at elevated temperatures such as those typically encountered in a pollution control device.

Suitable organic binder materials can include aqueous polymer emulsions, solvent-based polymers, and solvent free polymers. The aqueous polymer emulsions can include organic binder polymers and elastomers in the form of a latex (e.g., natural rubber lattices, styrene-butadiene lattices, butadiene-acrylonitrile lattices, and lattices of acrylate and methacrylate polymers or copolymers). The solvent-based polymeric binder materials can include a polymer such as an acrylic, a polyurethane, a vinyl acetate, a cellulose, or a rubber based organic polymer. The solvent free polymers can include natural rubber, styrene-butadiene rubber, and other elastomers.

In some embodiments, the organic binder material includes an aqueous acrylic emulsion. Acrylic emulsions advantageously tend to have good aging properties and non-corrosive combustion products. Suitable acrylic emulsions can include, but are not limited to, commercially available products such as those sold under the trade designation "RHOPLEX TR-934" (an aqueous acrylic emulsion having 44.5 weight percent solids) and "RHOPLEX HA-8" (an aqueous emulsion of acrylic copolymers having 45.5 weight percent solids) from Rohm and Hass (Philadelphia, Pa.); under the trade designation "NEOCRYL XA-2022" (an aqueous dispersion of an acrylic resins having 60.5 percent solids) available from ICI Resins US (Wilmington, Mass.); and under the trade designation "AIRFLEX 600BP DEV" (an aqueous emulsion of ethylene vinyl acrylate terpolymer having 55 weight percent solids) from Air Products and Chemical, Inc. (Philadelphia, Pa.).

Organic binders can also include a plasticizer, a tackifier, or a combination thereof. Plasticizers tend to soften a polymer matrix and can enhance the flexibility and moldability of the intumescent layer. For example, the organic binder can include a plasticizer such as isodecyl diphenyl diphosphate commercially available under the trade designation "SANTICIZER 148" from Monsanto (St. Louis, Mo.). Tackifiers or tackifying resins can aid in holding the insulation material together. An example of a suitable tackifier is commercially available from Eka Nobel, Inc. (Toronto, Canada) under the trade designation "SNOWTACK 810A".

The non-intumescent layer can also contain other materials such as, but not limited to, plasticizers, wetting agents, dispersants, defoaming agents, latex coagulants, and fungicides. Filler materials such as glass particles, calcium carbonate, expanded vermiculite, delaminated vermiculite, mica, perlite, aluminum trihydrate, magnesium phosphate hexahydrate, zinc borate, and magnesium hydroxide can be added. Additionally, inorganic binders such as clays, bentonite, and colloidal silica can be added.

The non-intumescent layers can also contain organic fibers such as, for example, acrylics, cellulose, polyolefin, polyvinyl alcohol, polyester, or combinations thereof. The fibers can be staple fibers or fibrillated fibers. Useful stable fibers typically have a size of about 0.5 to 5 denier. Suitable rayon fibers having a size of 1.5 denier per filament are commercially available from Minifiber, Inc. (Johnson City, Tex.). Suitable polyvinyl alcohol fibers are commercially available from Kuraray Americas, Inc. (New York, N.Y.) under the trade designation "KURALON". An acrylic fiber pulp is commercially available under the trade designation "CFF" from Cytek Industries, Inc. (West Paterson, N.J.).

A suitable non-intumescent layer can include, at least in some embodiment, inorganic fibers in an amount of 10 to 99.5 weight percent, organic binders in an amount of 0.5 to 20 weight percent. For example, the non-intumescent layer can contain inorganic fibers in an amount of 20 to 99.5 weight percent, organic binder in an amount of 0.5 to 20 weight percent, and up to 60 weight percent inorganic binders or fillers.

A suitable non-intumescent layer that contains heat-treated aluminosilicate ceramic fibers is commercially available from 3M Company (St. Paul, Minn.) under the trade designation "INTERAM 900HT". This mat has a bulk density of about 0.25 g/cm$^3$ and a weight per unit area of about 1020 to about 2455 g/m$^2$. Other suitable non-intumescent layers that contain crystalline (i.e., polycrystalline) alumina fibers include those commercially available from 3M Company under the trade designation "INTERAM 1100HT" and "INTERAM 1101 HT". These mats have a bulk density of about 0.15 g/cm$^3$ and a weight per unit area of about 440 to 2100 g/m$^2$. Another suitable non-intumescent layer that includes magnesium aluminosilicate glass fibers is commercially available from 3M Company under the trade designation "INPE 571.02." This mat has a bulk density of 0.12 g/cm$^3$ and a weight per unit area of about 600 to about 1400 g/m$^2$. A needle-bonded mat is commercially available from Mitsubishi Chemical Company, Tokyo, Japan under the trade designation "MAFTEC MLS-3" with a bulk density of about 0.16 g/cm$^3$. This mat contains about 72 weight percent $Al_2O_3$ and about 28 weight percent $SiO_2$ based on the weight of the fibers.

In the multilayer mats, the non-intumescent layer is sandwiched between a first intumescent layer and a second intumescent layer. The compositions of the two intumescent layers can be the same or different. Each intumescent layer contains at least one intumescent material. The intumescent layer can further include inorganic fibers, organic binders, plasticizers, wetting agents, dispersants, defoaming agents, latex coagulants, fungicides, filler materials, inorganic binders, and organic fibers.

Examples of suitable intumescent materials for the intumescent layers include unexpanded vermiculite, hydrobiotite, water swellable synthetic tetrasilicic fluorine type mica described in U.S. Pat. No. 3,001,571 (Hatch), alkali metal silicate granules as described in U.S. Pat. No. 4,521,333 (Graham et al.), expandable graphite, or combinations thereof. Alkaline metal silicate granules are commercially available from 3M Company (St. Paul, Minn.) under the trade designation "EXPANTROL 4BW". Expandable graphite is commercially available under the trade designation "GRAFOIL GRADE 338-5O" from UCAR Carbon Co., Inc. (Cleveland, Ohio). Unexpanded vermiculite is commercially available from Cometals Inc. (New York, N.Y.). In some applications, the intumescent materials are selected from unexpanded vermiculite, expandable graphite, or a combination thereof.

The vermiculite can be treated, for example, with salts such as ammonium dihydrogen phosphate, ammonium nitrate, anmmonium chloride, potassium chloride, or other soluble salts known in the art. The treatment is based on an ion exchange reaction.

The intumescent layer can, at least to some extent depending on the thickness of this layer, insulate the non-intumescent layer. Thus, inorganic fiber that would soften and shrink if included in an outer layer of the multilayer mat can be used in the inner non-intumescent layer because of the presence of the insulating intumescent layers. Depending on the operating temperature of the pollution control element and the thickness of the intumescent layer, ceramic materials having a bulk shrinkage greater than 10 percent can be included in the non-intumescent layer of the multilayer mat.

The intumescent layer often contain at least 5, at least 10, at least 20, at least 40, or at least 60 weight percent intumescent material based on the weight of the intumescent layer. In some examples, the intumescent layer contains 5 to about 85 weight percent intumescent material and no greater than 20 weight percent organic binder based on the weight of the intumescent layer. Some, but not all, of the intumescent layers can further include inorganic fibers.

In some more specific example, the intumescent layer includes intumescent materials in an amount of 5 to 85 weight percent, organic binder in an amount of 0.5 to 15 weight percent, and inorganic fibers in an amount of 10 to 60 weight percent based on the weight of the intumescent layer. In other examples, the intumescent layer includes intumescent materials in an amount of 5 to 70 weight percent, organic binder in an amount of 0.5 to 10 percent, and inorganic fibers in an amount of 30 to 45 weight percent based on the weight of the intumescent layer. In still other examples, the intumescent layer includes intumescent materials in an amount of 20 to 65 weight percent, organic binders in an amount of 0.5 to 20 weight percent, inorganic fibers in an amount of 10 to 65 weight percent, and up to 40 weight percent inorganic fillers or inorganic binders.

Suitable intumescent layers are commercially available from 3M Company (St. Paul, Minn.) under the trade designations "INTERAM 100", "INTERAM 200", "INTERAM 550", and "INTERAM 2000 LT". These mats usually have a bulk density of about 0.4 to about 0.7 g/cm$^3$ and a weight per unit area of about 1050 g/m$^2$ to about 8140 g/m$^2$. Another suitable intumescent layer is commercially available from 3M Company under the trade designation "INPE 570". This layer usually has a weight per unit area of about 1050 g/m$^2$ to about 4070 g/m$^2$ and contains inorganic fibers that that meet European non-classified fiber regulations.

In some intumescent layers, biosoluble inorganic fibers are included. Intumescent layers containing biosoluble fibers are further described in International Patent Application Publication WO 03/031368 (Howorth), incorporated herein by reference in its entirety. As used herein, "biosoluble inorganic fibers" refer to inorganic fibers that are decomposable in a physiological medium or a simulated physiological medium. Physiological medium refers to, but is not limited to, those bodily fluids typically found in the respiratory tract such as, for example, the lungs of animals or humans.

The biosoluble inorganic fibers typically include inorganic oxides such as, for example, $Na_2O$, $K_2O$, $CaO$, $MgO$, $P_2O_5$, $Li_2O$, and $BaO$, or combinations thereof with silica. Other metal oxides or other ceramic constituents can be included in the biosoluble inorganic fibers even though these constituents, by themselves, lack the desired solubility but are present in low enough quantities such that the fibers, as a whole, are still decomposable in a physiological medium. Such metal oxides include, for example, $Al_2O_3$, $TiO_2$, $ZrO_2$, $B_2O_3$, and iron oxides. The biosoluble inorganic fibers can also include metallic components in amounts such that the fibers are decomposable in a physiological medium or simulated physiological medium.

In one embodiment, the biosoluble inorganic fibers include oxides of silica, magnesium, and calcium. These types of fibers are typically referred to as calcium magnesium silicate fibers. The calcium magnesium silicate fibers usually contain less than about 10 weight percent aluminum oxide. Suitable biosoluble fibers can include 45 to 90 weight percent $SiO_2$, up to 45 weight percent CaO, up to 35 weight percent MgO, and less than 10 weight percent $Al_2O_3$. For example, the fibers can contain about 55 to about 75 weight percent $SiO_2$, about 25 to about 45 weight percent CaO, about 1 to about 10 weight percent MgO, and less than about 5 weight percent $Al_2O_3$.

Exemplary biosoluble inorganic oxides fibers are described in U.S. Pat. No. 5,332,699 (Olds et al.); U.S. Pat. No. 5,585,312 (TenEyck et al.); U.S. Pat. No. 5,714,421 (Olds et al.); and U.S. Pat. No.5,874,375 (Zoitas et al.). Various methods can be used to form biosoluble inorganic fibers including, but not limited to, sol gel formation, crystal growing processes, and melt forming techniques such as spinning or blowing.

Biosoluble inorganic fibers are commercially available from Unifrax Corporation (Niagara Falls, N.Y.) under the trade designation "INSULFRAX". Other biosoluble fibers are sold by Thermal Ceramics (located in Augusta, Ga.) under the trade designation "SUPERWOOL." For example, SUPERWOOL 607 contains 60 to 70 weight percent $SiO_2$, 25 to 35 weight percent CaO, 4 to 7 weight percent MgO, and a trace amount of $AM_2O_3$. SUPERWOOL 607 MAX can be used at a slightly higher temperature and contains 60 to 70 weight percent $SiO_2$, 16 to 22 weight percent CaO, 12 to 19 weight percent MgO, and a trace amount of $Al_2O_3$.

Exemplary intumescent layer can include intumescent material in an amount of 10 to 80 weight percent, biosoluble inorganic fibers in an amount of 5 to 80 weight percent, and micaceous binder in an amount of 5 to 80 weight percent.

As used herein, "micaceous binder" refers to one or more micaceous minerals that can be wetted and then dried to form a cohesive body that is self-supporting. As used herein, "self-supporting" refers to a micaceous binder that can be formed into a 5 cm×5 cm×3 mm sheet containing no other materials such that the dried sheet can be held horizontally at any edge for at least 5 minutes at 25° C. and up to 50 percent relative humidity without crumbling or otherwise falling apart.

As used herein, the phrase "micaceous mineral" refers to a family of minerals that can be split or otherwise separated into planar sheets or platelets. Micaceous minerals include, but are not limited to, expanded vermiculite, unexpanded vermiculite, and mica. Micaceous minerals typically have an average aspect ratio (i.e., the length of a particle divided by its thickness) that is greater than about 3. Micaceous minerals that typically have a particle size less than about 150 micrometers (e.g., the micaceous binder contains micaceous minerals that can pass through a 100 mesh screen). In some embodiments, the micaceous binder contains micaceous minerals having a size less than about 150 micrometers and having an average aspect ratio of greater than about 8 or greater than about 10.

Suitable micaceous binders can include micaceous minerals that have been crushed. As used herein, "crushed" refers to micaceous minerals that have been processed in any suitable manner that reduces the average particle size. Methods of crushing include, but are not limited to, mechanical shearing of a dilute or concentrated slurry, milling, air impact, and rolling. Other methods can be used alone or in combination with crushing to reduce the particle size. For example, thermal or chemical methods can be used to expand or expand plus exfoliate the micaceous minerals. Expanded vermiculite can be sheared or otherwise processed in water to produce an aqueous dispersion of delaminated vermiculite particles or platelets. Shearing can be adequately performed, for example, using a high shear mixer such as a blender.

In some embodiments, the micaceous binder includes processed vermiculites (i.e., vermiculate that has been expanded, delaminated, and crushed). Processed vermiculite is typically non-intumescent. In other embodiments, the micaceous binder includes vermiculite that has not been expanded and delaminated or that has been only partially expanded and delaminated. Such materials tend to be intumescent.

Suitable micaceous binders are commercially available from W. R. Grace & Company, and include a delaminated vermiculite powder (under the trade designation "VFPS") and an aqueous dispersion of chemically exfoliated vermiculite (under the trade designation "MICROLITE"). Also, expanded vermiculite flakes are available from W.R. Grace and Company (under the trade designation "ZONELITE #5") that can be reduced in particle size to form a micaceous binder.

The micaceous binder can include vermiculite having a particle size less than about 150 micrometers and the intumescent material can include vermiculite having a particle size greater than about 150 micrometers (none passes through a 100 mesh screen). The intumescent vermiculite can have an average particle size that is greater than about 300 micrometers.

In one embodiment of a multilayer mat, the non-intumescent layer contains glass fibers and the intumescent layers contain vermiculite as well as aluminosilicate fibers. In another embodiment of the multilayer mat, the non-intumescent layer contains ceramic fibers having a shrinkage no greater than 10 percent based on the TMA test and the intumescent layers contain vermiculite as well as ceramic fibers having a shrinkage no greater than 10 percent based on the TMA test. In yet another embodiment of the multilayer mat, the non-intumescent layer contains glass fibers and the intumescent layer contains vermiculite as well as biosoluble inorganic fibers.

Edge protection materials can also be added to the multilayer mats. Edge protection materials can be stainless steel wire wrapped around the edges as described in U.S. Pat. No. 5,008,086 (Merry), incorporated herein by reference. Other suitable edge protection materials include braided or rope-like glass, ceramic, or metal fibers as described in U.S. Pat. No. 4,156,533 (Close et al.), incorporated herein by reference. Edge protection materials can also be formed from compositions having glass particles as described in EP 639 701 A1 (Howorth et al.), EP 639 702 A1 (Howorth et al.), and EP 639 700 A1 (Stroom et al.), all of which are incorporated by reference.

The thickness of each layer in the multilayer mat can vary depending on the particular application. In some embodiments, the thickness of the non-intumescent layer is greater than the thickness of the first intumescent layer and is greater than the thickness of the second intumescent layer. In some applications, the thickness of the non-intumescent is at least 50 percent, at least 55 percent, at least 60 percent, at least 65 percent, at least 70 percent, at least 75 percent, or at least 80 percent of the total thickness of the multilayer mat. The overall uncompressed thickness of the mat is typically no greater than 40 mm, no greater than 36 mm, no greater than 32 mm, no greater than 30 mm, no great than 24 mm, or no greater than 20 mm.

In some applications, the non-intumescent layer has a thickness of at least 1, at least 2, at least 3 mm, at least 4 mm, at least 5 mm, or at least 6 mm. The thickness of the non-intumescent layer is typically less than 30 mm, less than 20 mm, or less than 15 mm. For example, the thickness of the non-intumescent layer can be 3 to 20 mm, 3 to 16 mm, 3 to 12 mm, 3 to 10 mm, 4 to 20 mm, 4 to 16 mm, 4 to 10 mm, 5 to 20 mm, 5 to 16 mm, 5 to 12 mm, 6 to 20 mm, 6 to 16 mm, 6 to 12 mm, or 6 to 10 mm. The thickness described herein refers to an uncompressed thickness.

The intumescent layer has a thickness of at least 0.5 mm, at least 0.8 mm, at least 1 mm, or at least 1.2 mm. The thickness of the intumescent layer is usually less than 20 mm, less than 10 mm, or less than 5 mm. For example, the thickness of the intumescent layer can be 0.5 to 10 mm, 0.5 to 8 mm, 0.5 to 6 mm, 0.5 to 5 mm, 0.5 to 3 mm, 0.5 to 2.5 mm, 0.5 to 2 mm, 0.8 to 3 mm, 1 to 3 mm, 1.2 to 3 mm, 1 to 2.5 mm, or 1 to 2 mm. The thickness described herein refers to an uncompressed thickness.

Each non-intumescent layer in the multilayer mat usually has a bulk density in the range of about 0.1 $g/cm^3$ to about 0.3 $g/cm^3$ while the intumescent layer has a bulk density in the range of about 0.4 $g/cm^3$ to about 0.7 $g/cm^3$. As used herein, the term "bulk density" refers to the density of a layer or multilayer mat that is not under compression. The bulk density of the multilayer mat depends on the thickness and composition of the various layers but is typically about 0.15 $g/cm^3$ to about 0.5 $g/cm^3$ or about 0.2 $g/cm^3$ to about 0.4 $cm^3$. In some applications, the multilayer mats have a compressed density of about 0.3 $g/cm^3$ to about 1.0 $g/cm^3$ or about 0.5 $g/cm^3$ to about 0.9 $g/cm^3$. As used herein, the term "compressed density" refers to the density of the multilayer mat after assembly of the pollution control device (i.e., the term refers to the density of the mat when positioned between the metal housing and the pollution control element).

The multilayer mats are often flexible. The mats typically can be handled and wrapped around a pollution control element in a pollution control device without breaking or cracking.

In yet another aspect, a method of forming a multilayer mat is provided. An non-intumescent layer is provided that has a first major surface and a second major surface opposite the first major surface. The non-intumescent layer includes inorganic fibers. A first intumescent layer is positioned to face the first major surface of the intumescent layer, wherein the first intumescent layer is a first outer layer of the multilayer mat. A second intumescent layer is positioned to face the second major surface of the intumescent layer, wherein the second intumescent layer is a second outer layer of the multilayer mat.

In some embodiments, a paper making process is used to form the non-intumescent layer, the intumescent layers, or combinations thereof. For example, the non-intumescent layer can be prepared by forming an aqueous slurry of the inorganic fibers. The aqueous slurry often contains up to 30 weight percent solids based on the weight of the slurry (e.g., the slurry can contain up to 20 weight percent or up to 10 weight percent solids based on the weight of the slurry). The slurry often contains at least 1 percent solids based on the weight of the slurry (e.g., slurry can contain at least 2 weight percent or at least 3 weight percent solids). In some embodiments, the slurry can contain 1 to 10, 2 to 8, or 3 to 6 weight percent solids. Higher solids can be advantageous because less water needs to be removed to prepare the preform. However, slurries with higher percent solids tend to be more difficult to mix.

Likewise, the intumescent layers can be prepared by forming an aqueous slurry of the intumescent material. The percent solids can be comparable to those used to prepare the non-intumescent layer.

The water used in each aqueous slurry can be well water, surface water, or water that has been treated to remove impurities such as salts and organic compounds. When well or surface water is used in the aqueous slurry, salts (e.g., calcium and magnesium salts) present in the water can function as an inorganic binder. In some embodiments, the water is deionized water, distilled water, or a combination thereof.

Other additives can also be included in each aqueous slurry composition. Such additives can be inorganic binders, inorganic fillers, defoamers, flocculants, surfactants, and the like. Strength enhancing agents also can be included such as, for example, organic fibers.

The entire multilayer mat can be prepared using a paper making process. One such process is described in U.S. Patent Publication 2001/0046456 (Langer et al.), the disclosure of which is incorporated herein by reference. A first slurry containing an intumescent material can be prepared and then deposited on a permeable substrate. The deposited first slurry can be partially dewatered to form a first layer. A second slurry that is non-intumescent and that contains inorganic fibers can be prepared and then deposited on an outer surface of the first layer. The deposited second slurry can be partially dewatered to form a second layer. A third slurry containing an intumescent material can be prepared and then deposited on an outer surface of the second layer. The deposited third slurry can be at least partially dewatered to form a third layer. After the final layer has been deposited, the mat can be dried to remove at least a portion of any remaining water. For example, the mat can be compressed and dried by passing the mat through heated rollers Such a process can result in some intermingling of the layers. The intermingling of the layers can be practically invisible to the eye or can be to such an extent that a visible boundary or gradient layer forms between two adjacent layers. With such a process, the layers can be bonded together without the use of an adhesive, stitches, needles, or staples.

In yet other embodiments, one or more of the intumescent layers can be sprayed onto a surface of the non-intumescent layer that was prepared using a papermaking process or an alternative process.

The individual layers can be individually prepared and then bonded together. Some of the multilayer mats have an adhesive to adhere the non-intumescent layer to the first intumescent layer, the second intumescent layer, or a combination thereof. The adhesive can be a pressure sensitive adhesive or a hot melt adhesive. In some multilayer mats, the adhesive is a hot melt adhesive such as, for example, the adhesive commercially available from Bostik Findley (Middleton, Mass.) under the trade designation "PE 105-50" or "PE 65-50". These are polyester based hot melt adhesives but other hot melt adhesives known in the art can be used. In other embodiments, the various layers of the multilayer mat can be bonded to each other using needle punching or stitch bonding techniques. With a needle punching method, some of the fibers from one layer are pulled into the adjoining layer resulting in at least some bonding between the adjoining layers.

Other methods can be used to prepare the non-intumescent layer. In some applications, the non-intumescent layer can be prepared as a non-woven mat by chopping individual inorganic fibers to a desired length. For example, the individualized fibers can be prepared by chopping a tow or yarn of fiber using a glass roving cutter commercially available under the trade designation "MODEL 90 GLASS ROVING CUTTER" from Finn and Fram, Inc. (Pacoma, Calif.). Alternatively, the chopped individualized fibers can be formed using a hammer mill and then a blower. The fibers are usually chopped to a length ranging from about 0.5 to about 15 cm. A mat can be formed using a conventional web forming machine such as those commercially available from Rando Machine Corp. (Macedon, N.Y.) under the trade designation "RANDO WEBBER" or from ScanWeb Co. (Denmark) under the trade designation "DAN WEB". The chopped individualized fibers can be drawn onto a wire screen or mesh belt (e.g., a metal or nylon belt). Depending on the length of the fibers, the resulting mat can have sufficient handleability to be transferred to a needle punch or stitch bonding machine without a support such as a scrim. To facilitate ease of handing, some mats can be formed or placed on a scrim.

A needle-punched nonwoven mat refers to a mat where there is physical entanglement of the inorganic fibers provided by multiple full or partial penetrations of the mat with barbed needles. Needle punching generally involves compressing a nonwoven mat and then punching and drawing barbed needles through the mat. Although the optimum number of needle punches per area of mat depends on the particular application, the nonwoven mat is often punched to provide about 5 to about 60 punches/cm$^2$. In some applications the mats have 10 to about 20 punches/cm$^2$. The nonwoven mat can be needle punched using a conventional needle punching machine such as those commercially available from Dilo (Germany) with barbed needles commercially available from Foster Needle Company (Manitowoc, Wis.).

Alternatively, the nonwoven mat can be stitch bonded using techniques such as those disclosed in U.S. Pat. No. 4,181,514 (Lefkowitz et al.), the disclosure of which is incorporated herein by reference. The mat can be stitch bonded using an organic thread or an inorganic thread (e.g., ceramic or stainless steel). A relatively thin layer of inorganic or organic sheet material can be placed on either or both sides of the mat during stitching to prevent or minimize the threads from cutting through the mat. The spacing of the stitches can be varied but is usually about 3 to about 30 mm so that the fibers are uniformly compressed throughout the entire area of the mat. A commercially available needle punched non-intumescent layer can be obtained from Mitsubishi Chemical (Tokyo, Japan) under the trade designation "MAFTEC".

Figure 2:
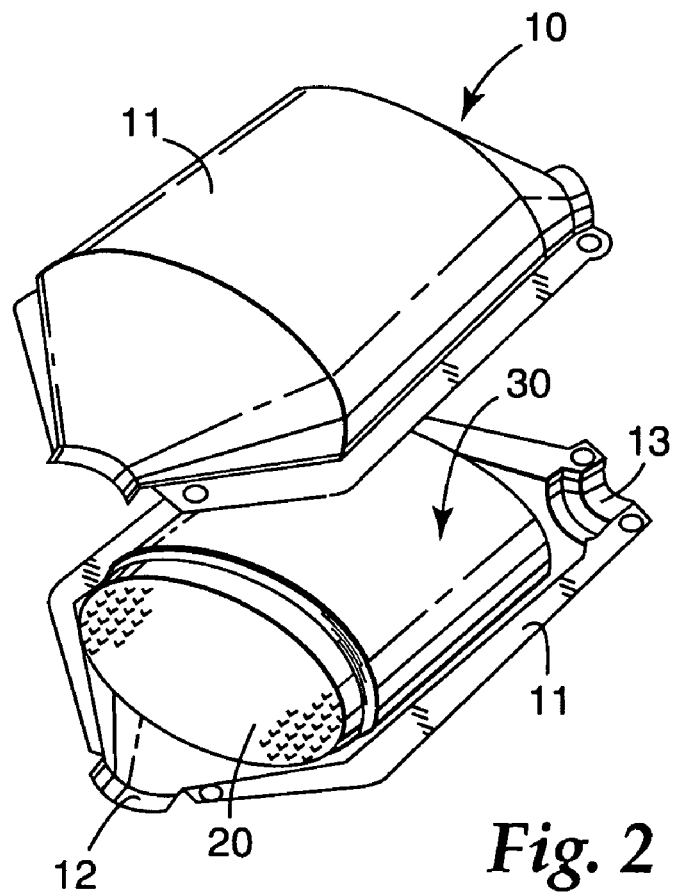
FIG. 2 is a schematic perspective view of a catalytic converter incorporating an embodiment of the present invention and shown in disassembled relation.

In another aspect, a pollution control device is provided that has a first metal housing, a pollution control element inside the first metal housing, and a multilayer mat positioned between the first metal housing and the pollution control element. The multilayer mat includes at least three layers: a non-intumescent layer having a first major surface and a second major surface opposite the first major surface, wherein the non-intumescent layer includes inorganic fibers; a first intumescent layer facing the first major surface of the non-intumescent layer, wherein the first intumescent layer is a first outer layer of the multilayer mat; and a second intumescent layer facing the second major surface of the non-intumescent layer, wherein the second intumescent layer is a second outer layer of the multilayer mat. Pollution control devices are included in the exhaust system of motorized vehicles to reduce atmospheric pollution. An illustrative example of a pollution control device in the form of a catalytic converter 10 is shown in FIG. 2. The catalytic converter 10 generally includes a metal housing 11 surrounding a pollution control element 20, also referred to as a catalytic converter element or a monolith. The metal housing 11 has an inlet 12 and an outlet 13 through which a flow of exhaust gases flows into and out of catalytic converter 10, respectively. The metal housing 11, which is also referred to as a can or a casing, can be fabricated from one or more metals, metal alloys, or intermetallic compositions. For example, the metal housing 11 can be stainless steel or austenitic steel.

Suitable catalytic converter elements are known in the art and include those made of metal, ceramic, or other materials. A variety of ceramic catalytic converter elements are commercially available. For example, a honeycomb ceramic catalytic converter element is commercially available under the trade designation "CELCOR" by Corning Inc. (Corning, N.Y.), and another is commercially available under the trade designation "HONEYCERAM" by NGK Insulated Ltd (Nagoya, Japan). Metal catalytic converter elements are commercially available from Emitec (Lohmar, Germany).

One or more catalyst materials can be coated onto the catalytic converter element 20 in accordance with conventional practices. The catalysts used in the catalytic converter element 20 are typically one or more metals (e.g., ruthenium, osmium, rhodium, iridium, nickel, palladium, and platinum) and/or metal oxides (e.g., vanadium pentoxide and titanium dioxide). Most commonly, these catalysts function to oxidize or otherwise eliminate exhaust contaminants such as carbon monoxide and hydrocarbons. Such catalysts also can function to help reduce the amount of oxides of nitrogen in engine exhaust gases.

To provide a large amount of surface area, the catalytic converter element 20 generally has relatively thin walls. As a result of these thin walls, the catalytic converter element 20 can be fragile and susceptible to breakage. A mounting mat or sheet material 30, disposed between the metal housing 11 and the catalytic converter element 20, helps protect the fragile catalytic converter element 20 from damage due to road shock and vibration. Mounting mat or sheet material 30 also helps prevent exhaust gasses from passing between the catalytic converter element 20 and the metal housing 11.

Figure 3:
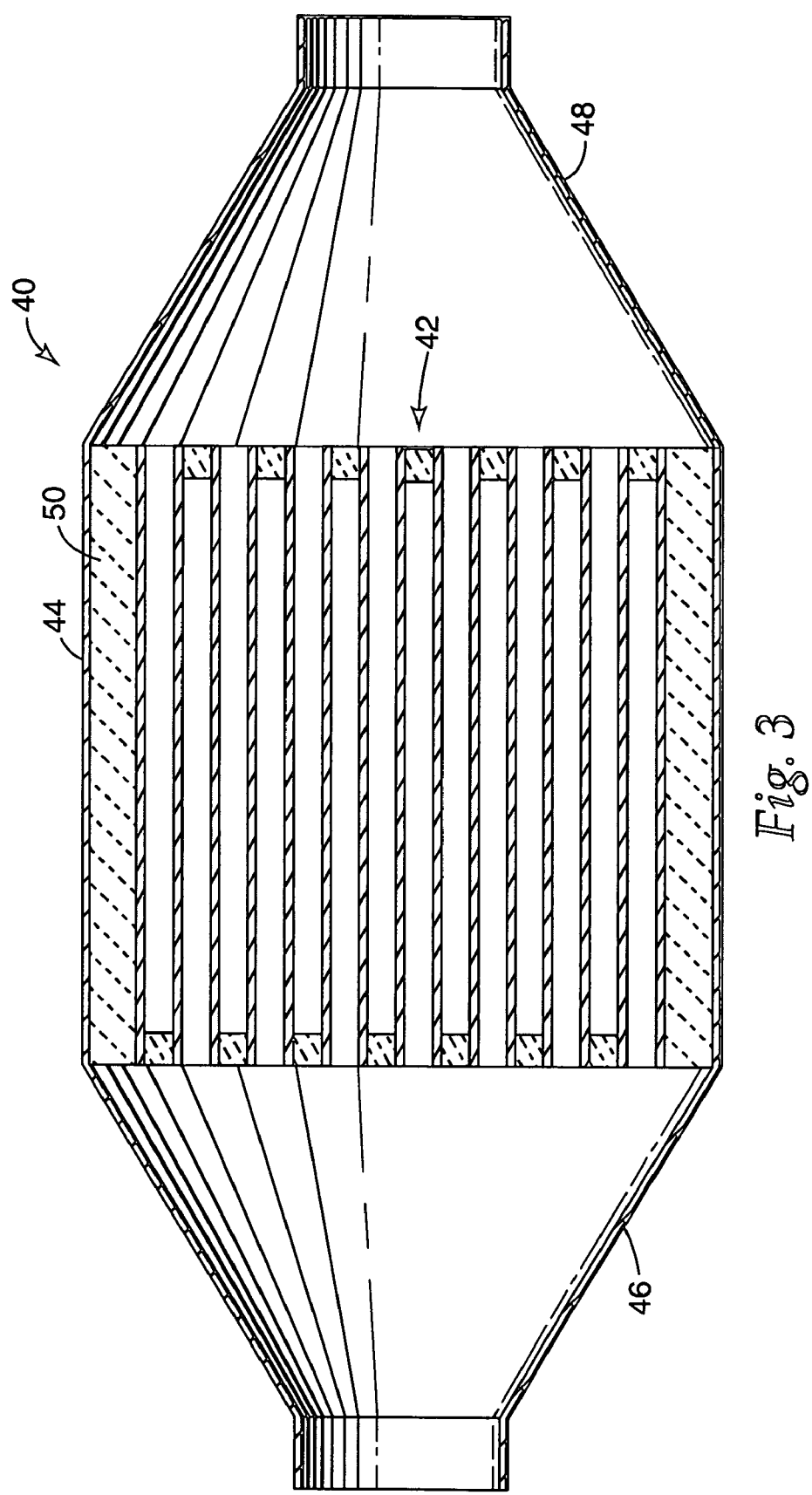
FIG. 3 is a schematic longitudinal central section through a diesel particulate filter incorporating an embodiment of the present invention.

FIG. 3 shows a representative example of a pollution control device in the form of diesel particulate filter 40. The diesel particulate filter 40 is a wall flow filter that includes a honeycombed monolithic structure 42 (also referred to as a monolith or monolithic structure) having a bundle of tubes. A catalyst may be coated onto the monolithic structure 42 of the diesel particulate filter 40. The monolithic structure 42 is often prepared from a ceramic material. Such diesel particulate filter elements are commercially available from a number of sources including, for example, Corning Inc. of Corning, N.Y., and NGK Intumescent Layer Ltd. of Nagoya, Japan. Useful diesel particulate filter elements are discussed in Howitt et al., "Cellular Ceramic Diesel Particulate Filter," Paper No. 810114, SAE Technical Paper Series, 1981.

The diesel particulate filter 40 includes a metal housing 44 having inlet 46 and outlet 48. Metal housing 44 surrounds the monolith 42. A mounting mat or sheet material 50, disposed between the monolith 42 and the metal housing 44, provides the same benefits as mounting mat 30 of FIG. 3.

Both the catalytic converter and diesel particulate filter elements are often in the form of a ceramic monolith. Ceramic monoliths are often described by their wall thickness an the number of openings or cells per square inch (cpsi). In the early 1970s, monoliths with a wall thickness of 12 mils and a cell density of 300 cpsi were common ("12/300 monoliths" where the numerator refers to the thickness of the wall in mils and the denominator refers to the number of cells per square inch). As emission laws became more stringent, wall thicknesses have decreased as a way of increasing geometric surface area. The standard has progressed to 6/400 monoliths. However, to further enhance performance of the pollution control devices, even thinner walled monoliths such as 4/400, 4/600, 4/900, 3/600, 3/900, and 2/900 have been developed. These monoliths are even more delicate and more susceptible to breakage.

A ceramic monolith has a coefficient of thermal expansion that can be an order of magnitude less than the metal housing into which it is placed. In some pollution control devices, as the engine heats the pollution control element from about 25° C. to a maximum operating temperature of about 900° C., the metal housing increases to a temperature of about 530° C. (i.e., the temperature of the metal housing is lower because the outer surface of the metal housing is exposed to ambient conditions). Even though the metal housing undergoes a smaller temperature change than the pollution control element, the higher coefficient of thermal expansion of the metal housing compared to the ceramic monolith results in greater expansion of the metal housing. In some applications, the gap between the metal housing and the ceramic monolith can increase from about 4 mm to about 4.3 mm. The gap can be even greater than this in other applications.

For example, when the pollution control device includes a Selective Catalytic Reduction (SCR) system, an agent (e.g., an aqueous urea solution) is added to convert oxides of nitrogen ($NO_x$) into nitrogen. SCR systems are generally used on heavy-duty commercial vehicles equipped with diesel engines. The corrosive environment of the SCR systems often result in the use of austenitic steels for the metal housing in the pollution control device. However, austenitic steels have a higher coefficient of thermal expansion than other metals that would be suitable for use in a non-corrosive environment (e.g., the thermal expansion coefficient of austenitic steel is approximately 50% higher than the thermal expansion coefficient of ferritic stainless steels). This higher coefficient of thermal expansion can result in an even larger gap between the metal housing and the ceramic monolith.

The pollution control device can further include a second metal housing surrounding the first metal housing. For example, the pollution control element inside the first housing can be mounted within a muffler (i.e., the first metal housing is adjacent to the mounting mat and the second housing includes the walls of the muffler). The exhaust gas passes between the first and second housing before or after passing through the pollution control element. The presence of the hot gases in the space between the first and second metal housing causes the temperature of the first metal housing to be relatively close to the temperature of the pollution control element. This design of the pollution control device can result in the metal housing adjacent to the mounting mat (i.e., the first metal housing) increasing to a temperature that is relatively close to the temperature of the pollution control element. This increased temperature of the first housing compared to the temperature of a metal housing exposed to ambient conditions can lead to even greater thermal expansion of the first metal housing relative to the ceramic monolith. The gap between the first metal housing and the ceramic monolith can be increased compared to the gap in a pollution device where the outer surface of the metal housing is exposed to ambient conditions.

Figure 4:
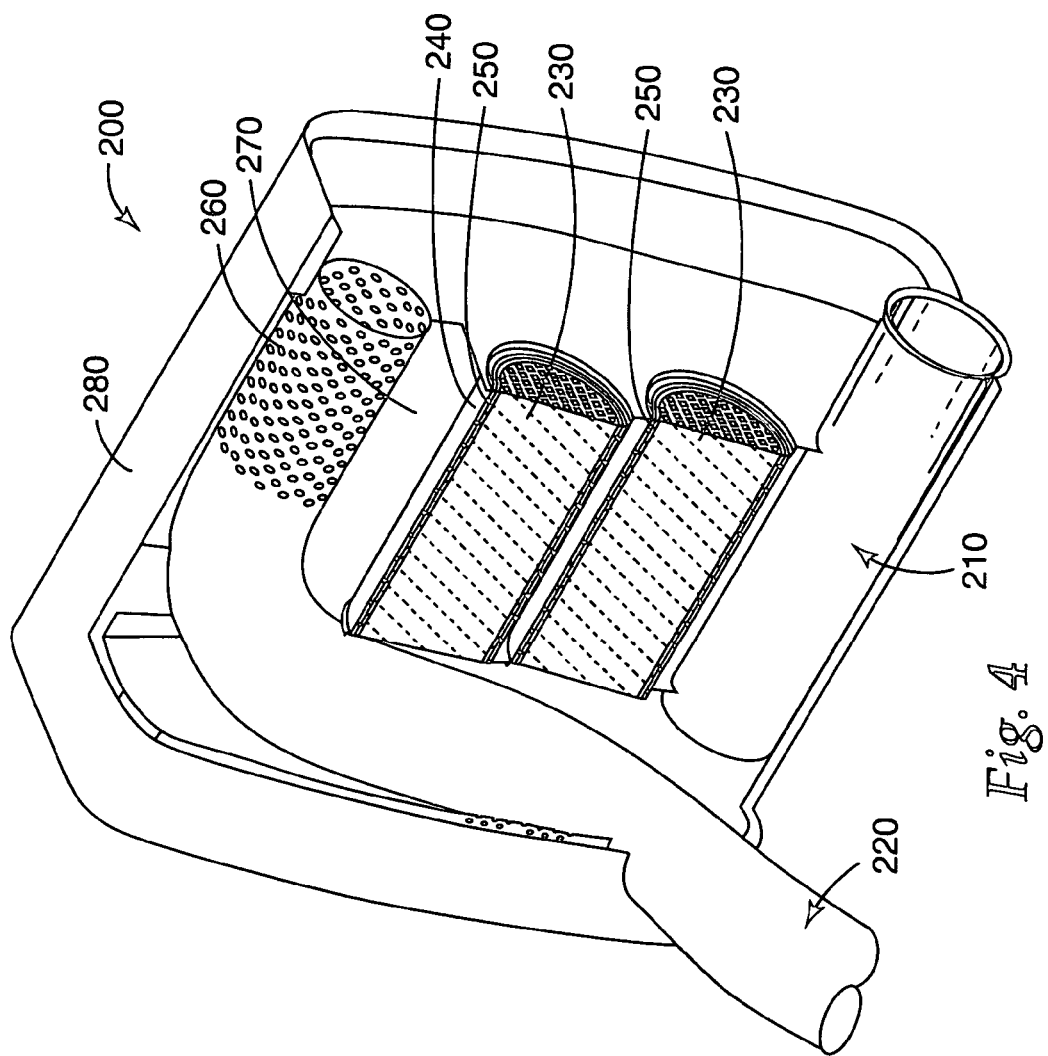
FIG. 4 is a schematic cut-out view of a pollution control device in which the exhaust gas passes between a first metal housing and a second metal housing.

One such pollution control device is shown in FIG. 4. The exhaust gas enters a muffler that contains the pollution control device 200. The exhaust gas enters the muffler through pipe 210 and leaves the muffler through pipe 220. While in the muffler, the exhaust gas passes through a pollution control element 230. The muffler can contain 1 or more pollution control elements 230. In FIG. 4, there are two pollution control elements arranged in a parallel manner. Each pollution control element 230 is wrapped with a mounting mat 250. The mounting mat 250 is positioned between the pollution control element 230 and a first metal housing 240. After passing through the pollution control elements 230, the exhaust gas can enter the exhaust pipe 220. The exhaust pipe 220 has a perforated section 260. Some of the exhaust gas can pass through the perforations in the perforated section 260 to enter the main chamber 270 of the muffler. By entering the main chamber 270 of the muffler, there is exhaust gas between the inner metal housing 240 and the muffler housing 280.

The need to compensate for gap changes between the first metal housing of the pollution control device and the pollution control element is complicated by the fact that during normal use, the mounting mat can be exposed to a range of temperatures depending, for example, on driving time and geographical area. Under some conditions, the mat may be exposed to temperatures insufficient to expand an intumescent material (e.g., under about 400° C. or under about 500° C.). Under other conditions, the mat may be exposed to temperatures ranging up to about 900° C. These elevated temperatures can cause some mats to undergo shrinkage. A mat that shrinks might not be able to function effectively as a mounting mat. For pollution control devices that operate at such high temperatures, the non-intumescent layer typically includes inorganic fibers having a bulk shrinkage no greater than 10 percent using the TMA test.

The size of the gap between the first metal housing (i.e., the metal housing closest to the pollution control element; the metal housing adjacent to the multilayer mat) and the pollution control element depends on the temperature of both the ceramic monolith and the first metal housing. Where the temperature of one or both is below about 400° C. or below about 500° C., the intumescent material is often in an unexpanded state; the multilayer mat, which is typically compressed at room temperature, can provide sufficient holding power for the pollution control element. At higher temperature, such as at least about 400° C. or at least about 500° C., the intumescent material can expand to fill the increased gap resulting from the differences in the thermal expansion of the metal housing and the ceramic monolith.

The multilayer mats of the invention, depending on the composition, can be advantageously used under a variety of driving and temperatures conditions. The multilayer mats can be suitable for use with most known vehicular pollution control devices.

The foregoing describes the invention in terms of embodiments foreseen by the inventor for which an enabling description was available, notwithstanding that insubstantial modifications of the invention, not presently foreseen, may nonetheless represent equivalents thereto.

EXAMPLES

Test Methods

Real Condition Fixture Test

The Real Condition Fixture Test (RCFT) simulates actual operating conditions found within a pollution control device having a monolith (e.g., a catalytic converter element or a diesel particulate filter) surrounded by a mounting mat. The test measures the pressure exerted by the mounting mat and is conducted under isothermal conditions to simulate a pollution control device housed within a muffler. The RCFT method is described in detail in Hans Bode, ed., *Material Aspects in Automotive Pollution Control Devices*, Wiley-VCH, pp.-206-208 (2002).

A 44.45 mm by 44.45 mm sample of a multilayer mat was positioned between two 50.8 mm by 50.8 mm heated stainless steel platens. The mount density of the multilayer sample, i.e., when it was mounted between the platens, was 0.70 to 0.73 g/cm$^3$. The mount density was about 1 gram/cm$^3$ for an intumescent mat, and about 0.40 g/cm$^3$ for a non-intumescent mat. Each platen, controlled independently, was heated to a temperature of 450° C. or 550° C. Simultaneously, the space or gap between the platens was increased by a value calculated from the temperature and the thermal expansion coefficients of the materials in a typical pollution control device of the type specified. Three cycles of heating and cooling were run on each sample at each temperature. For each cycle with the first sample, each of the platens was heated to a peak temperature of 450° C., held for 15 minutes, and then cooled to approximately room temperature, e.g. about 20° C. For each cycle with the second sample, each of the platens was heated to a peak temperature of 550° C., held for 15 minutes, and then cooled to approximately room temperature.

After the three RCFT cycles were run, data curves were generated showing the pressure between the two plates as a function of temperature. The pressure (i.e., mount pressure) at each peak temperature during the first and third cycles as well as the minimum mount pressure during the first cycle was reported. A minimum mount pressure of about 50 kPa is generally needed to secure the monolith during actual use of the pollution control device.

Bulk Shrinkage (TMA)

The bulk shrinkage of a mass of ceramic fibers was determined by Thermal Mechanical Analysis (TMA) using a Theta Dilatronic II Thermal Analyzer, Model MFE-715 (obtained from Theta Industries, Inc., Port Washington, N.Y.) having a chart recorder. A sample of inorganic fiber was cut using a circular die having a diameter of 11 mm and placed on a platen in the furnace. A 7 mm diameter quartz rod (about 35.6 cm long) supporting a 1350 gram weight was placed over the sample and the furnace was closed. This corresponds to a load of about 50 psi (345 kN/m$^2$) applied to the sample. The sample with the applied weight was allowed to stabilize for about 5 minutes prior to heating to 1000° C. at a rate of 15° C./min. After the oven reached 1000° C., the furnace was turned off and cooled to room temperature. The sample was cooled within the furnace. The thickness of the sample, measured as the gap between the end of the rod and the platen, was plotted on a chart recorder during both the heating and cooling cycles. The percent shrinkage was calculated from the thickness (T1) recorded at 750° C. during the heating cycle and the thickness (T2) recorded at 750° C. during the cooling cycle. The bulk shrinkage was calculated as % Bulk Shrinkage=$[(T1-T2)/T1] \times 100$.

The TMA test can be used for samples with or without organic binder materials. Organic materials will usually burn out at about 500° C. During the heating cycle, the thickness of the sample measured at 750° C. is essentially the thickness of the mass of fibers with inorganic binders and particles, if present. As the sample is heated further, any shrinkage of the fibers that occurs up to 1000° C. will be apparent during the cooling cycle if the thickness measured at 750° C. is less than the thickness of the sample during the heating cycle.

Example 1

A multilayer mat was constructed by laminating a non-intumescent fiber layer between two intumescent layers. Two "INTERAM 100" Intumescent Mat Mounts from 3M Company (St. Paul, Minn.) were used as the intumescent layers. Each intumescent layer had a weight per unit area of 1050 g/m$^2$ and a thickness of about 1.7 mm. A glass fiber mat "INPE 571.02" Mat Mount from 3M Company was used as the non-intumescent layer. This glass mat has a bulk density of about 0.14 g/cm$^3$, a weight per unit area of 800 g/m$^2$, and a thickness of about 5.8 mm. One major surface of each intumescent layer was sprayed with "FOAM FAST 74 SPRAY ADHESIVE" from 3M Company. One major surface of the non-intumescent layer was adhered to one intumescent layer and then the other major surface of the non-intumescent layer was adhered to the other intumescent layer. That is, the non-intumescent glass fiber layer was laminated between the two intumescent layers. A rolling pin was lightly rolled over the 3-layer mat to bond the layers, and the mat was dried in an oven set at 85° C. for about 5 minutes. The resulting multilayer mat had a thickness of about 9.2 mm.

The multilayer mat was tested using the RCFT at two different peak temperatures. The data in Table 1 includes the room temperature pressure, the minimum pressure during the first heating cycle, the pressure after 1 cycle at maximum temperature, and the pressure after 3 cycles at maximum temperature.

Example 2

A multilayer mat was constructed according to the procedure of Example 1 except that the two intumescent layers were "INPE 570" Intumescent Mat Mount, each having a weight of 1050 g/m² and a thickness of about 1.7 mm. These intumescent layers were obtained from 3M Company (St. Paul, Minn.). The resulting multilayer mat had a thickness of about 9.2 mm. The mat was tested using the RCFT and results are shown in Table 1.

Reference Example R1

Reference Example R1 was a "INPE 571.02" non-intumescent mat obtained from 3M Company (St. Paul, Minn.). Data for this sample is shown in Table 1.

Reference Example R2

Reference Example R2 was an "INTERAM 100" Intumescent Mat Mount obtained from 3M Company (St. Paul, Minn.). Data for this sample is shown in Table 1.

TABLE 1

| | Mount Pressure and Density | | | | | | |
|---|---|---|---|---|---|---|---|
| | Mount Density | Pressure | Min Pressure | Pressure @ 450° C. | | Pressure @ 550° C. | |
| Ex | g/cc | RT | 1st cycle | 1st cycle | 3rd cycle | 1st cycle | 3rd cycle |
| 1 | 0.73 | 413 kPa | 90 kPa | 380 kPa | 176 kPa | | |
| 2 | 0.71 | 411 kPa | 120 kPa | 228 kPa | 87 kPa | | |
| R1 | 0.40 | 399 kPa | 99 kPa | 99 kPa | 85 kPa | | |
| R2 | 1.08 | 380 kPa | 33 kPa | 444 kPa | 70 kPa | | |
| 1 | 0.73 | 463 kPa | 100 kPa | | | 555 kPa | 240 kPa |
| 2 | 0.70 | 392 kPa | 100 kPa | | | 323 kPa | 102 kPa |
| R1 | 0.40 | 393 kPa | 46 kPa | | | 46 kPa | 25 kPa |
| R2 | 1.06 | 383 kPa | 22 kPa | | | 333 kPa | 257 kPa |

Examples 3-5

Glass fiber mats for Examples 3-5 are prepared according to Examples 1-3, respectively, of PCT Patent Publication No. WO2004/011785 (Merry), incorporated in its entirety herein by reference. All of the mats have a weight per unit area of about 800 g/m² mat and a thickness of about 5.8 mm. Multilayer mats are prepared by laminating each glass fiber mat between two layers of "INTERAM100" Intumescent Mat Mount available from 3M Company (St. Paul, Minn.), each intumescent layer having a weight per unit area of 1050 g/m².

The glass fiber mat for Example 3 is made from S-2 Glass fibers that are essentially shot-free and have a diameter about 9 μm, chopped to a length of 25.4 mm (401 S-2 Glass Chopped Strands obtainable from Advanced Glassfiber Yarns LLC (Aiken, S.C.).

The glass fiber mat for Example 4 is made from E Chopped glass strands having a of diameter 9 μm, chopped to a length of 25.4 mm (obtainable from Advanced Glassfiber Yarns LLC, Aiken, S.C.).

The glass fiber mat for Example 5 is made from R Glass fibers (typical composition 60 % $SiO_2$, 25% $Al_2O_3$, 9% CaO, and 6% MgO) having a diameter of about 10 μm and chopped to a length of 36 mm (available from Saint-Gobain Vetrotex Deutschland GmbH, Herzogenrath, Germany).

The glass fiber mats were laminated to the intumescent layers using the procedure described in Example 1.

Examples 6-7

Multilayer mats are prepared according to the procedure of Example 1 by laminating a non-intumescent ceramic fiber layer between two intumescent layers. The two intumescent layers are "INTERAM 100" Intumescent Mat Mount available from 3M Company (St. Paul, Minn.). Each intumescent layer has a weight per unit area of 1050 g/m² and a thickness of about 1.7 mm. The non-intumescent mat for Example 6 is "INTERAM 1100 HT" Non-intumescent Mat Mount available from 3M Company. The non-intumescent mat for Example 7 is "INTERAM 1101 HT" Non-intumescent Mat Mount available from 3M Company. Both non-intumescent mats are available from 3M Company, and are formed from crystalline alumina fibers (i.e., polycrystalline alumina fibers).

Example 8

A multilayer mat is prepared by placing the S-2 Glass fiber mat of Example 2 between two layers of "INTERAM 100" Intumescent Mat Mount each having a weight per unit area of 1050 g/m² and a thickness of about 1.7 mm. These layers are available from 3M Company (St. Paul, Minn.). The mat is then needle-punched together using barbed needles to provide a physical entanglement of fibers between the three layers. A suitable needle puncher is commercially available under the trade designation "DILO" from Dilo of Germany, with commercially available barbed needles (Foster Needle Company, Inc., of Manitowoc, Wis.). The mat is needle punched to provide about 12 needle punches/cm².

Examples 9-14

Intumescent mats having biosoluble fibers are prepared as described in Example 1 of WO03/031368, incorporated in its entirety herein by reference. Briefly, the expanded delaminated vermiculite is dispersed in water within a Waring blender for about 3 minutes to delaminate and crush the vermiculite. This forms a micaceous binder. The expanded delaminated vermiculite is available under the trade designation "ZONOLITE" EXPANDED VERMICULITE #5" from W. R. Grace (Cambridge, Mass.). Then fibers (both biosoluble inorganic fibers and rayon fibers) are dispersed in the slurry for about 5 seconds, and the latex (i.e., organic binder) is added. The biosoluble inorganic fiber is "SUPERWOOL 607", available from Thermal Ceramics (Augusta, Ga.). The rayon fibers are 0.635 mm long rayon fibers, available from Minifibers, Inc. (Johnson City, Tenn.). An organic binder is added in the form of a latex. The latex is 55% solids ethylene vinyl acetate latex "AIRFLEX 600BP", available from Air Products Polymers (Allentown, Pa.). A 50% solids aqueous solution of aluminum sulfate is added to coagulate the latex, and the unexpanded vermiculite (i.e., intumescent material) is added and mixed to form a uniform dispersion that can be formed into a mat using conventional papermaking processes. The unexpanded vermiculite can be obtained from Cometals, Inc. (New York N.Y.). The mat compositions, in dry weight percent, are shown in Table 2.

Two sheets of each of the intumescent mats are then laminated with a hot melt adhesive to the S-2 glass fiber mat and the R-glass fiber mat described in Examples 3 and 5, respectively. Sheets of hot melt adhesive, available under the trade designation "BOSTIK POLYESTER 105-50 WEB ADHESIVE" from Bostik Findley Corp. (Middleton, Mass.), are placed on sheets of intumescent mat and heated until the adhesive is molten and coats the mat (between about 110 and about 140° C.). The non-intumescent glass fiber layer is then placed between two adhesive coated intumescent sheets and lightly rolled with a rolling pin to laminate the layers. The constructions are summarized in Table 2.

TABLE 2

Multilayer Mat compositions

| Example | Intumescent Layer Compositions | | | | | Non-intumescent Layer Composition Type of Glass Mat |
|---|---|---|---|---|---|---|
| | % Micaceous binder | % Biosoluble Inorganic Fiber | % Organic Binder | % Intumescent Material | % Rayon Fibers | |
| 9 | 16.9 | 26.9 | 8.2 | 47.4 | 0.7 | S-2 glass |
| 10 | 21.8 | 21.8 | 6.9 | 48.5 | 1.0 | S-2 glass |
| 11 | 23.5 | 24.0 | 6.5 | 46.0 | 0 | S-2 glass |
| 12 | 16.9 | 26.9 | 8.2 | 47.4 | 0.7 | R-glass |
| 13 | 21.8 | 21.8 | 6.9 | 48.5 | 1.0 | R-glass |
| 14 | 23.5 | 24.0 | 6.5 | 46.0 | 0 | R-glass |

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A multilayer mat comprising:
   a non-woven non-intumescent layer comprising inorganic fibers;
   a first intumescent layer forming a first outer layer of the multi layer mat; and
   a second intumescent layer forming a second outer layer of the multilayer mat,
   wherein the non-intumescent layer is positioned between the first intumescent layer and the second intumescent layer.

2. The multilayer mat of claim 1, wherein; the first intumescent layer and the second intumescent layer each comprise an intumescent material selected from the group consisting of vermiculite, expandable graphite, and combinations thereof.

3. The multilayer mat of claim 1, Wherein the non-intumescent layer has a thickness that is at least 50 percent of a total thickness of the multilayer mat.

4. The multilayer mat of claim 1, wherein the non-intumescent layer is thicker than the first intumescent layer and the non-intumescent layer is thicker than the second intumescent layer.

5. The multilayer mat of claim 1, wherein the inorganic fiber comprises a ceramic fiber having a bulk shrinkage no greater than 10 percent.

6. The multilayer mat of claim 1, wherein the inorganic fibers comprise glass fibers.

7. The multilayer mat of claim 1, wherein the inorganic fibers comprise glass fibers and both the first and second intumescent layers comprise vermiculite.

8. The multilayer mat of claim 1, wherein the inorganic fibers comprise a ceramic fiber having a bulk shrinkage no greater than 10 percent and both the first and second intumescent layers comprise vermiculite.

9. The multilayer mat of claim 1, wherein at least two layers of the multilayer mat are bonded together with at least one of an adhesive, needle bonding, or stitching.

10. A pollution control device comprising:
    a first metal housing;
    a pollution control element inside the first metal housing;
    a multilayer mounting mat positioned between the first metal housing and the pollution control element, said multilayer mounting mat comprising:
    a non-intumescent layer comprising inorganic fibers;
    a first intumescent layer forming a first outer layer of the multilayer mat; and
    a second intumescent layer forming a second outer layer of the multilayer mat,
    wherein the non intumescent layer is positioned between the first intumescent layer and the second intumescent layer.

11. The pollution control device of claim 10, further comprising a second metal housing surrounding the first metal housing, wherein an exhaust gas passes between the first metal housing and the second metal housing.

12. The pollution control device of claim 11, wherein the pollution control element is a diesel particulate filter.

13. The pollution control device of claim 11, wherein the pollution control element is a catalytic converter element and the pollution control device is a catalytic converter.

14. The pollution control device of claim 10, wherein the non-intumescent layer has a thickness that is at least 50 percent of the total thickness of the multilayer mat.

15. The pollution control device of claim 10, wherein the non-intumescent layer is thicker than the first intumescent layer and the non-intumescent layer is thicker than the second intumescent layer.

16. The pollution control device of claim 10, wherein the inorganic fibers comprise ceramic fibers having a bulk shrinkage less than 10 percent.

17. The pollution control device of claim 10, wherein the inorganic fibers comprise glass fibers.

18. The pollution control device of claim 10, wherein the inorganic fibers comprise glass fibers and both the first and second intumescent layers comprise vermiculite.

19. The pollution control device of claim 10, wherein the mounting mat has sufficient holding pressure at operating temperatures both higher than and lower than a temperature suitable for expanding the first and second intumescent layers.

20. The pollution control device of claim 10, wherein the non-intumescent layer is non-woven.

21. A method of forming the multilayer layer mat, said method comprises:
provided a non-woven non-intumescent layer having a first major surface and a second major surface opposite said first major surface, said non-intumescent layer comprising inorganic fibers;
positioning a first intumescent layer facing the first major surface of the non-intumescent layer, said first intumescent layer being a first outer layer of the multilayer mat; and
positioning a second intumescent layer facing the second major surface of the non-intumescent layer, said second intumescent layer being a second outer layer of the multilayer mat.

* * * * *

UNITED STATES PATENT AND TRADEMARK OFFICE
CERTIFICATE OF CORRECTION

PATENT NO. : 7,550,118 B2
APPLICATION NO. : 10/823852
DATED : June 23, 2009
INVENTOR(S) : Richard P. Merry It is certified that error appears in the above-identified patent and that said Letters Patent is hereby corrected as shown below:

Column 3
Line 59, delete "Beckaert" and insert -- Bekaert --, therefor.
Line 62, delete "(Gahana," and insert -- (Gahanna, --, therefor.

Column 4
Line 34, delete "Yams," and insert -- Yarns, --, therefor.
Line 35, delete "Owens-Coming" and insert -- Owens-Corning --, therefor.
Line 43, delete "40:60." and insert -- 40:60, --, therefor.

Column 5
Line 8, delete "RT"with" and insert -- RT" with --, therefor.
Line 25, delete "40:60." and insert -- 40:60, --, therefor.
Line 51, delete "(Tonawonda," and insert -- (Tonawanda, --, therefor.

Column 6
Line 48, delete "(Widness" and insert -- (Widnes --, therefor.
Line 52, delete "(Tonawonda," and insert -- (Tonawanda, --, therefor.

Column 7
Line 30, delete "(Tonawonda," and insert -- (Tonawanda, --, therefor.

Column 11
Line 1, delete "anmmonium" and insert -- ammonium --, therefor.

Column 12
Line 30, delete "$AM_2O_3$." and insert -- $Al_2O_3$ --, therefor.

Column 15
Line 34, after "rollers" insert -- . --.

Column 16
Line 1, delete "(Pacoma," and insert -- (Pacoima, --, therefor.

Column 17
Line 9, delete "Coming" and insert -- Corning --, therefor.

UNITED STATES PATENT AND TRADEMARK OFFICE
CERTIFICATE OF CORRECTION

PATENT NO. : 7,550,118 B2
APPLICATION NO. : 10/823852
DATED : June 23, 2009
INVENTOR(S) : Richard P. Merry It is certified that error appears in the above-identified patent and that said Letters Patent is hereby corrected as shown below:

Column 23
Line 62, in claim 1, delete "multi layer" and insert -- multilayer --, therefor.

Column 24
Line 1, in claim 2, delete "wherein;" and insert -- wherein --, therefor.
Line 6, in claim 3, delete "Wherein" and insert -- wherein --, therefor.
Line 58, in claim 10, delete "non intumescent" and insert -- non-intumescent --, therefor.

Column 26
Line 6, in claim 21, delete "the" and insert -- a --, therefor.
Line 7, in claim 21, delete "comprises:" and insert -- comprising: --, therefor.

Signed and Sealed this

Twenty-ninth Day of September, 2009

David J. Kappos
*Director of the United States Patent and Trademark Office*